Figure 1:
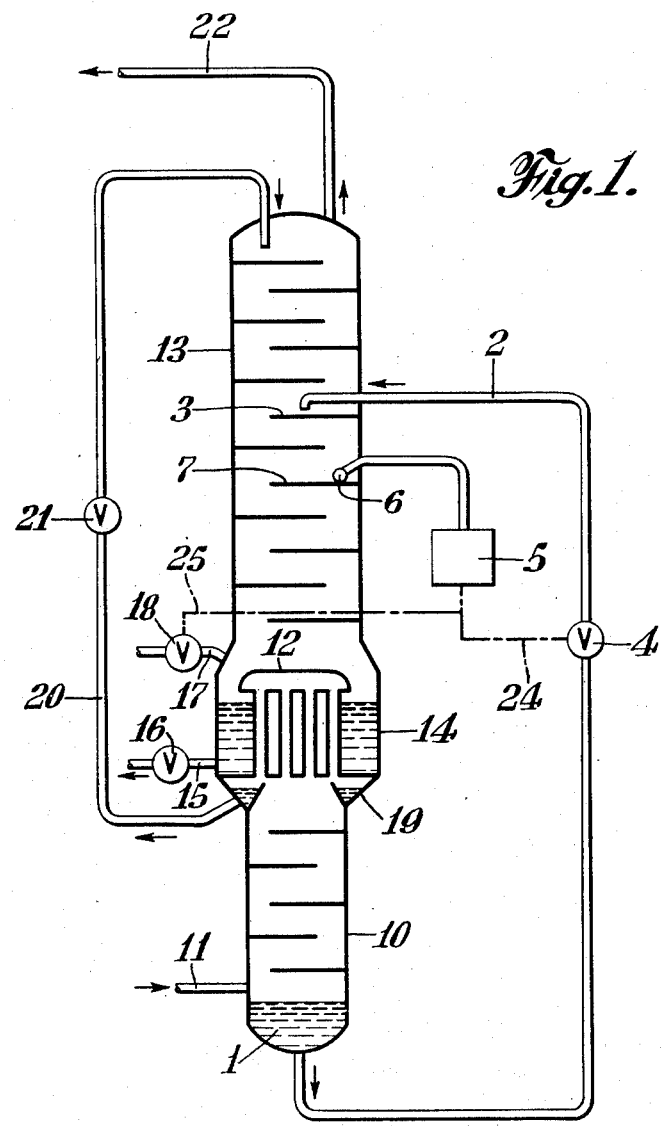

April 16, 1957 P. M. SCHUFTAN 2,788,638
PROCESS OF AND APPARATUS FOR SEPARATION OF GAS MIXTURES
Filed Oct. 15, 1952 2 Sheets-Sheet 1

INVENTOR
PAUL M. SCHUFTAN
BY
D.C. Harrison
ATTORNEY

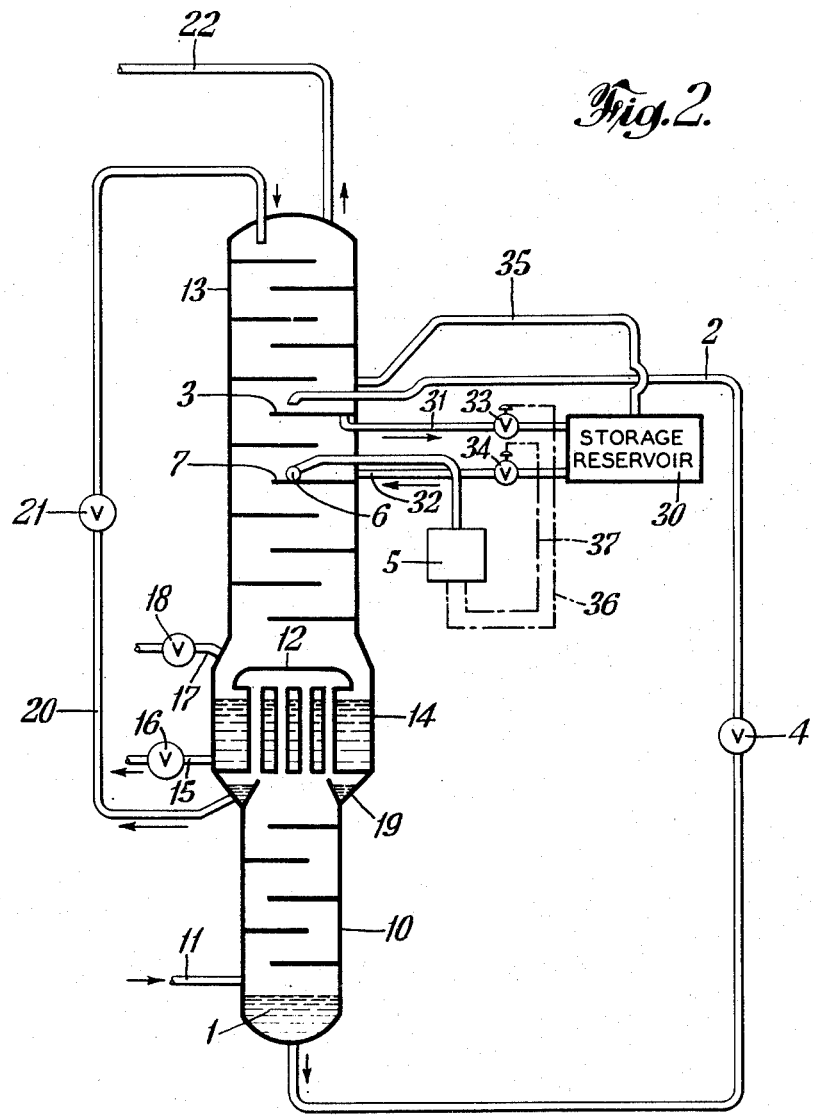

2,788,638

PROCESS OF AND APPARATUS FOR SEPARATION OF GAS MIXTURES

Paul Maurice Schuftan, Richmond Hill, England, assignor to The British Oxygen Company Limited, a British company Application October 15, 1952, Serial No. 314,824

7 Claims. (Cl. 62—2)

This invention relates to the separation of gas mixtures such as air by liquefaction and subsequent rectification. While the invention can be applied to processes of the type producing gaseous oxygen as hereinafter described, it is particularly useful when applied to processes for the production of liquid oxygen of oxygen content above 99%.

In such processes for the production of liquid oxygen the yield and purity of the oxygen produced are affected to a high degree by variations in the refrigeration performance of the separation plant. The optimum conditions of yield and purity of oxygen are obtained when the refrigeration performance of the plant is such that liquefaction of the air occurs to an extent equivalent to the oxygen recoverable from the air. A small increase in the extent of liquefaction, however, will lead to the production of a liquid oxygen fraction of insufficient purity for commercial use. On the other hand, a decrease in the amount of liquefaction results in a decreased yield of liquid oxygen.

If the refrigeration performance of the plant is equal to the average cold requirements of the plant, such that liquefaction occurs to the optimum extent, such variations may be caused by even slight disturbances in the operation of the plant, for example, by the blowing of drains or by the change-over of refrigerating driers.

In order to avoid the production of lower-purity oxygen by such variations in the extent of liquefaction, it has heretofore been customary to operate the plant at a refrigeration performance below that required for optimum liquefaction with a consequent decrease in the yield of oxygen.

It is one object of the present invention to provide a process for the production of liquid oxygen of purity above 99% from air which avoids any loss of purity of the oxygen by fluctuations in the refrigeration performance of the plant without any decrease in the oxygen yield.

While the process of the invention has particular advantages when applied to air separation processes for the production of liquid oxygen, it may be applied with advantage to processes producing oxygen in gaseous form where such processes require a substantially constant temperature gradient in the rectification zone, for example, where a side stream has to be withdrawn therefrom. Such a side stream could serve either to remove a fraction relatively rich in argon and containing a preponderance of either oxygen or nitrogen, whereby the bulk of the oxygen and nitrogen are obtained at very high purity, or the side stream could serve to remove a fraction rich in argon and having a very low nitrogen content for use as the feed to an argon column. In both cases, it is an advantage if the temperature at the point of withdrawal of the side stream is fixed and controlled within narrow limits.

According to the present invention, a process for the separation of air by liquefaction and subsequent rectification comprises the steps of supplying refrigeration to the separation plant equal to the average cold requirements of the plant, and automatically maintaining substantially constant the temperature gradient in the rectification zone independent of temporary fluctuations in the refrigeration performance of the plant.

In one form of the invention particularly applicable to processes for the production of liquid oxygen, the temperature gradient in the rectification zone may be maintained substantially constant by withdrawing excess liquid formed when, owing to a variation in the refrigeration performance, the liquid supplied is excessive, storing such withdrawn liquid and returning liquid to the rectification zone when the liquid supplied is insufficient.

The withdrawal of the excess liquid from and its return to the rectification zone may be arranged to be automatically controlled in accordance with the fluctuations in temperature at a point of maximum temperature gradient within the zone, caused by changes in the refrigeration performance of the plant. For example, a sensitive thermometer such as that of the vapor pressure type may be inserted in the rectification zone at a point of maximum temperature gradient and the temperature changes registered thereby arranged to operate valves controlling the withdrawal and return of the excess liquid, so as to restore the temperature to its correct value. By this means the temperature gradient within the zone can be maintained within close limits. The thermometer may if desired be arranged for pressure compensation so that its reliability and sensitivity may be unaffected should the operating pressure of the rectification zone fluctuate.

Alternatively, where the rectification is carried out in a conventional double column, the temperature gradient in the upper column may be maintained substantially constant by automatically controlling the whole or part of the flow of oxygen-enriched liquid from the lower column to the upper column in accordance with temperature fluctuations at a point of maximum temperature gradient in the upper column. When the cold supplied is excessive, the corresponding drop in the temperature of the control point will close a valve controlling the oxygen-enriched liquid flow to the upper column, the excess liquid formed in the lower column being stored in the sump of that column. When the cold supplied is deficient, the valve is automatically opened to increase the flow of liquid to the upper column, the extra liquid necessary being drawn from that stored in the sump of the lower column during periods when the cold supplied was excessive.

In another form of the invention particularly applicable when part or the whole of the oxygen is to be produced as gas, the temperature gradient in the rectification zone may be maintained substantially constant by automatically controlling the rate of withdrawal of the gaseous oxygen from the lower part of the rectification zone in accordance with temperature fluctuations at a point of maximum temperature gradient in the rectification zone.

Other objects and advantages of the invention will become apparent from a consideration of the following description and accompanying drawings in which:

Fig. 1 schematically illustrates a conventional double- or two-stage rectifying column for air separation and which includes an exemplary means for practicing a process according to the invention; and Fig. 2 schematically illustrates a modified exemplary embodiment of the present invention.

Referring to the drawing, a liquid enriched in oxygen, so-called "rich liquid," from the lower column sump 1 is led through the pipe 2 on to a feed tray 3 in the upper column at an intermediate point.

The rate of withdrawal from the lower column sump 1 is controlled by an automatically operated regulating valve 4 actuated by a suitable controller 5. The valve 4 can control the whole rich liquid flow or, by use of a by-pass not shown, only a part of the flow.

A vapor pressure thermometer 6 is installed at a point of maximum temperature gradient 7 in the upper column, below the feed tray 3, in contact with the liquid on a tray at such point. The thermometer 6 is connected to operate the controller 5 and can be arranged for pressure compensation so that its reliability and sensitivity may be unaffected should the operating pressure of the column fluctuate.

The other features shown may be conventional. Thus, the lower column 10 for the higher-pressure preliminary stage of rectification has an inlet 11 for the air to be separated near the sump 1, the upper end of the lower column 10 being closed by a main condenser 12. The upper column 13 for the main stage of rectification at lower pressure has an enlarged base chamber 14 which collects and provides a bath of oxygen product about the main condenser 12. A pipe 15 having a control valve 16 leads from the chamber 14 for withdrawal of liquid oxygen when the plant produces a liquid oxygen product. If the plant is for producing gaseous oxygen, the gaseous oxygen product may be withdrawn from above the liquid level in chamber 14 by a conduit 17 controlled by a regulating valve 18.

Below the condenser 12 a shelf 19 is provided in the upper part of the lower column to collect liquid nitrogen produced by the condenser. This liquid nitrogen is transferred to the top of the upper column for a reflux liquid feed through a pipe 20 controlled by a valve 21. The nitrogen product of separation is passed from the top of the upper column 13 by a conduit 22 which may conduct it to heat exchangers for cooling incoming air. The controller 5 may operate the regulating valve 4 through a transmission indicated by broken line 24.

If the plant refrigeration increases, the composition of the liquid at 7 will tend to increase in concentration of the lower-boiling constituent, i. e., nitrogen, and the temperature recorded by the thermometer 6 will tend to decrease. This brings the controller 5 into operation and causes the withdrawal valve 4 to close, so decreasing the rate of withdrawal of "rich liquid" from the lower column sump 1. Similarly, if the plant refrigeration decreases, the temperature recorded by the vapor pressure thermometer 6 will tend to increase, and the rate of withdrawal of "rich liquid" will be increased by causing the controller 5 to open the withdrawal valve 4. By this means the liquid composition at 7 can be maintained constant within close limits and the yield and purity of the liquid oxygen produced at the base of the upper column remains unaffected by the variations in plant refrigeration.

In the embodiment illustrated, the lower column sump 1 acts as the "rich liquid" reservoir, so that an increase or decrease in the plant refrigeration will cause a corresponding decrease or increase of the amount of liquid stored in the lower column sump 1. By this means it is possible to operate the plant in such a way that the refrigeration performance is equal to the average cold requirements of the plant. The normal liquid level in the lower column sump 1 corresponds to the average cold requirement, and the capacity of the lower column sump is made sufficient to allow for the variations in level caused by the variations in the cold requirements of the plant.

Although a preferred embodiment of the invention has been described in detail, it is contemplated that modifications may be made within the spirit of the invention and scope thereof as set forth in the claims; for example, the excess liquid may be passed to an insulated chamber separate from the lower column, and, when the liquid supplied is insufficient, the stored liquid may be returned to the upper column at a rate to balance the deficiency.

A preferred embodiment of this modification is shown in Fig. 2, wherein excess liquid may be withdrawn from the upper column 13 by a conduit 31 which is connected to tray 3. An insulated storage reservoir 30 receives liquid withdrawn through conduit 31. Liquid is returned from the storage reservoir to column 13 through a conduit 32 which opens into a lower point of column 13. An open connection 35 between the top of reservoir 30 and column 13 serves to equalize pressures in the column and the reservoir, and is essential to facilitate flow of liquid through conduit 31 into the reservoir. Liquid withdrawal through conduit 31 and liquid return through conduit 32 are controlled by valves 33 and 34 in the respective conduits. The valves are, in turn, regulated by valve control mechanism 5 having a temperature sensing bulb 6 disposed in the column 13 at a point of maximum temperature gradient. The valve control mechanism 5 responds to temperature variations in the column and is operative when the refrigeration supply to the separation plant exceeds the cold requirement to open valve 33 for withdrawing excess liquid from the column 13 as required for maintaining a substantially constant temperature gradient in the column. The valve control mechanism 5 is also operative when the cold requirement exceeds the refrigeration supply to the separation plant to open valve 34 for returning liquid from the reservoir to the column as required to maintain a substantially constant temperature gradient in the column.

When the plant produces gaseous oxygen, the regulating valve 18 is employed and may be adjusted automatically by the controller 5 through a transmission 25, the transmission 24 to regulating valve 4 being then disconnected. Thus, when the temperature gradient in the column tends to grow smaller due to a small excess of refrigeration, the controller 5 will slightly close the valve 18 and this will maintain the oxygen purity and prevent the lowering of the temperature of the oxygen bath in chamber 14. On the other hand, if refrigeration supply becomes slightly deficient, the temperature at the point 7 will tend to increase, and the controller 5 will act to slightly open valve 18 to hold the temperature gradient in the column substantially constant.

The principles of the invention may also be applied to the separation of low-boiling-point gas mixtures similar to air.

I claim:

1. In a process for the separation of air by liquefaction and rectification in a separation plant with a rectification zone having a temperature gradient, the steps of supplying refrigeration to the separation plant equal to the average cold requirements of the plant, the refrigeration supply being subject to temporary variations, and maintaining the temperature gradient in the rectification zone constant by accumulating excess liquid formed when the refrigeration supply exceeds the cold requirement and passing such liquid to the rectification zone when the cold requirement exceeds the refrigeration supply, and controlling said accumulating and said passing in accordance with temperature fluctuation tendencies at a point of maximum temperature gradient in said rectification zone.

2. Process according to claim 1, wherein said accumulating is accomplished by withdrawing excess liquid formed when the refrigeration supplied exceeds the cold demand and storing said withdrawn liquid, and said passing is accomplished by returning said liquid to the rectification zone as required when the cold demand exceeds the refrigeration supplied.

3. In a process for the separation of air by liquefaction and rectification in a separation plant wherein rectification is carried out in conventional two stages, the steps of supplying refrigeration to the separation plant equal to the average cold requirement of the plant, the refrigeration supply being subject to temporary variations, and maintaining the temperature gradient in the second stage substantially constant by controlling the flow of rich liquid from the first stage to the second stage in accordance with temperature fluctuation tendencies at a point of maximum temperature gradient in said second stage.

4. In a plant for the separation of a gas mixture by liquefaction and rectification in which refrigeration is supplied to the gas mixture to be separated at a rate equal to the average cold requirements of the plant and which rate is subject to temporary variations, said plant including a rectifying column having relatively warmer and colder ends producing, respectively, higher- and lower-boiling-point separation products, there being a temperature gradient in said column, the combination with such column of means for accumulating excess liquid formed when the refrigeration supply exceeds the cold requirement including a reservoir for temporarily storing such liquid, means for automatically passing said liquid to said column as required when the cold requirement exceeds the refrigeration supply, and means responsive to the temperature in the rectifying column substantially at a point of maximum temperature gradient and operable in accordance with the effect of temperature variations of said column for controlling said means for accumulating and said means for passing.

5. In a plant for the separation of a gas mixture by liquefaction and rectification in which refrigeration is supplied to the gas mixture to be separated at a rate equal to the average cold requirement of the plant and which rate is subject to temporary variations, said plant including a rectifying column having relatively warmer and colder ends producing, respectively, higher- and lower-boiling-point separation products, there being a temperature gradient in said column, the combination with such column of means for withdrawing excess liquid formed when the refrigeration supply exceeds the cold requirements, reservoir means for temporarily storing such liquid, and means for automatically passing said liquid to said column as required when the cold requirements exceed the refrigeration supply, means responsive to the temperature in the rectifying column substantially at a point of maximum temperature gradient and operable in accordance with the effect of temperature variations of said column for controlling said means for accumulating and said means for passing.

6. In a plant for the separation of a gas mixture by liquefaction and rectification in which refrigeration is supplied to the gas mixture to be separated at a rate equal to the average cold requirement of the plant and which rate is subject to temporary variations, said plant including a rectifying column having relatively warmer and colder ends producing, respectively, higher- and lower-boiling-point separation products, there being a temperature gradient in said column, the combination with such column of means for accumulating excess liquid formed when the refrigeration supply exceeds the cold requirements including a reservoir for temporarily storing such liquid, means for automatically passing said liquid to said column as required when the cold requirements exceed the refrigeration supply, and a control device having a thermally responsive element in said column substantially at a point of maximum temperature gradient, and mechanism operable in accordance with the effect of temperature variations of said thermally responsive element for controlling said means for accumulating excess liquid and said means for passing said liquid to said column.

7. Apparatus according to claim 6 in which the plant includes a preliminary column for a first stage of rectification at a relatively higher pressure and said reservoir for temporarily storing liquid is incorporated in the lower part of said preliminary column.

References Cited in the file of this patent
UNITED STATES PATENTS

| | | |
|---|---|---|
| 2,105,214 | De Baufre | Jan. 11, 1938 |
| 2,180,715 | Messer | Nov. 21, 1939 |
| 2,311,512 | Backstrom | Feb. 16, 1943 |
| 2,360,468 | Brown | Oct. 17, 1944 |
| 2,501,999 | Fausek | Mar. 28, 1950 |
| 2,541,409 | Cornelius | Feb. 13, 1951 |
| 2,599,133 | Schilling | June 3, 1952 |
| 2,650,482 | Lobo | Sept. 1, 1953 |
| 2,650,483 | Schuftan | Sept. 1, 1953 |
| 2,664,718 | Rice | Jan. 5, 1954 |
| 2,758,793 | Stoops | Aug. 14, 1956 |